(12) United States Patent
Kulkarni

(10) Patent No.: US 6,930,690 B1
(45) Date of Patent: Aug. 16, 2005

(54) PRESERVING GRAY COLORS

(75) Inventor: Manish S. Kulkarni, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 99 days.

(21) Appl. No.: 10/168,057

(22) PCT Filed: Oct. 19, 2000

(86) PCT No.: PCT/US00/41337

§ 371 (c)(1),
(2), (4) Date: Jun. 17, 2002

(87) PCT Pub. No.: WO02/33957

PCT Pub. Date: Apr. 25, 2002

(51) Int. Cl.[7] .............................................. G09G 5/02
(52) U.S. Cl. ..................... 345/589; 345/600; 345/591; 345/597; 345/89; 382/167; 382/181; 382/266; 382/176; 358/296; 358/1.9
(58) Field of Search ................................ 345/600, 589, 345/591, 597, 89; 382/167, 181, 266, 176; 358/1.9, 296

(56) References Cited

U.S. PATENT DOCUMENTS

| 5,835,098 | A | * | 11/1998 | Lipton | 345/589 |
| 5,867,277 | A | * | 2/1999 | Melen et al. | 358/296 |
| 6,008,907 | A | * | 12/1999 | Vigneau et al. | 358/1.9 |
| 6,301,386 | B1 | * | 10/2001 | Zhu et al. | 382/176 |
| 6,522,778 | B1 | * | 2/2003 | Tamagawa | 382/167 |
| 6,606,420 | B1 | * | 8/2003 | Loce et al. | 382/266 |
| 2002/0146171 | A1 | * | 10/2002 | Chandrasekhar | 382/181 |
| 2003/0142865 | A1 | * | 7/2003 | Hirota et al. | 382/167 |

* cited by examiner

Primary Examiner—Matthew C. Bella
Assistant Examiner—Tam Tran
(74) Attorney, Agent, or Firm—Fish & Richardson P.C.

(57) ABSTRACT

Method and apparatus for preserving gray colors in an electronic document. An electronic document is received. The document contains a plurality of objects having a plurality of object types. Objects of a type which require gray preservation are selected. The colors of selected objects are tested for gray. The gray color test is conducted in a local color space, or alternatively in a device independent color space after converting the objects colors to the device independent color space after converting the objects colors to the device independent color space. The gray color test in the test color space is a strict color test, or alternatively is a relaxed color test. Objects containing only gray colors are identified, and their colors are preserved by inhibiting color management of their colors. Color management is inhibited by saving the objects colors in a color space which is not color managed, or alternatively, by tagging the objects or associating an attribute with the objects to indicate the objects should not be color managed.

29 Claims, 2 Drawing Sheets

PRESERVING GRAY COLORS

TECHNICAL FIELD

This invention relates to a method and apparatus for preserving neutral or gray colors attributed to certain types of objects within a document, such as text objects.

BACKGROUND

In the field of graphic arts, graphic artists create and combine text and images from various applications such as the Adobe Photoshop®, Adobe Illustrator®, and Adobe InDesign® computer programs (all available from Adobe Systems Incorporated, of San Jose, Calif.) to create professional graphic documents. For example, images may be created in Adobe Photoshop®, while line art may be created in Adobe Illustrator®, and the entire page layout may be synthesized in Adobe InDesign®. Ultimately, a finished graphic document may be printed on a specifications for web offset publications (SWOP) press or other cyan, magenta, yellow, and black (CMYK) based output device.

During the process of creating a graphic document, elements such as images, fills, line art, and text may move from one application to another until they take their final form and the entire document is sent to a printer. The steps a document goes through, from the creation and merging of its component elements to its final editing and printing, using different applications and display devices along the way, is termed its workflow. Most modern graphics applications include color management routines that perform some degree of color management, or manipulation of the colors of objects within a document, as the document is imported into, and exported out of, the applications.

Color management routines are designed to reconcile the different color capabilities of the various scanners, monitors, cameras, and printers that may create or handle an object or a document as the object or document travels along its workflow. Typically, color management routines include routines to read and write device profiles, and to render colors from a source color space associated with a source device to a destination color space associated with a destination device. Device profiles define the color characteristics of the source and destination devices, and are used by the color management routines to map object colors from the source color space to the destination color space through an intermediate, device independent, color space. Depending on the color gamuts of the source and destination devices, not all of the colors available in the source color space may be available in the destination color space. Colors that are available in the source color space but unavailable in the destination color space are mapped to an appropriate destination color available in the destination color space by the color management routines.

As a result of color management, particularly as a result of mapping out-of-gamut colors in the destination color space to their nearest in-gamut colors, colors associated with objects in a document may undergo subtle changes as the document moves along its workflow. While color management induced color changes are useful for many objects in a document, it is important that some objects retain their color throughout a document's workflow. For example, a black or neutral gray text object incorporated into a document as a label ought to retain its neutral color throughout the document's workflow. By retaining its color, such an object will be printed using only a printer's black ink, and will therefore appear in print to have a neutral black or gray color as intended.

Currently, the colors of all objects in a document are color managed or manipulated throughout the document's workflow by the color management routines of each application handling the document. As a result, text objects created with neutral grays and blacks may lose their "grayness" over the course of the workflow, and be printed with non-neutral colors. For example, a black text object created in an RGB color space in one application may be transformed to an HSB color space in another application and back to an RGB color space of a third application as the document containing the text object moves along its workflow. If as a result of color management, or color transformation errors, the final text object's red, green, and blue color-tuple components are not identical, the object will not be printed with the printer's black ink alone, but will be printed with an admixture of the printer's cyan, yellow, or magenta inks. Thus, the object will lose its intended neutral gray color in print.

SUMMARY

The invention discloses a gray preservation method and apparatus for preserving neutral gray colors in electronic documents.

An application using the gray preservation method receives an electronic document containing a variety of objects having a variety of object types. Composite objects are reduced to their irreducible component objects, and the irreducible component objects are individually subjected to the gray preservation method. Objects of a type which require gray preservation are selected, while objects of a type which do not require gray preservation are not further processed. Objects of a type which require gray preservation are text, line, curve, fill, gradient, bitmap, and image objects.

Objects of a type which require gray preservation are tested for grayness. The test for grayness is conducted in the color space in which the selected objects' colors are represented. Alternatively, the objects' colors are converted to a device independent color space, and the test for grayness is conducted in the device independent color space. The gray color test applied to objects represented in a given color space exploits the manner in which gray colored objects are represented in that color space. The test can be strict or relaxed. The strict test requires gray objects have their colors represented exactly as gray colored objects are represented in the given color space. The relaxed test requires gray objects have their colors approximately represented as gray colored objects are represented in the given color space.

The strict and relaxed gray color tests for objects whose colors are represented in an RGB color space require the objects' colors have red, green, and blue components which are exactly and approximately equal to each other, respectively. The strict and relaxed gray color tests for objects whose colors are represented in a CMYK color space require the objects' colors have cyan, magenta, and yellow components which are exactly and approximately equal to zero, respectively. The strict and relaxed gray color tests for objects whose colors are represented in a CIEXYZ color space require the objects' colors have X, Y, and Z components, normalized to the corresponding component in the diffuse white point, which are exactly and approximately equal to each other, respectively.

Objects that do not contain any grays fail the gray color test, and are not further processed. Objects that contain a mixture of grays and other colors also fail the gray color test, and are not further processed. Objects that contain only gray colors pass the gray color test, and are selected for gray preservation. Gray preservation is accomplished by inhibiting color management for objects passing the gray color test. Color management is inhibited by converting the objects' colors to a color space which is not color managed by the application. Alternatively, color management is inhibited by tagging the objects to indicate they should not be color managed by the application.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
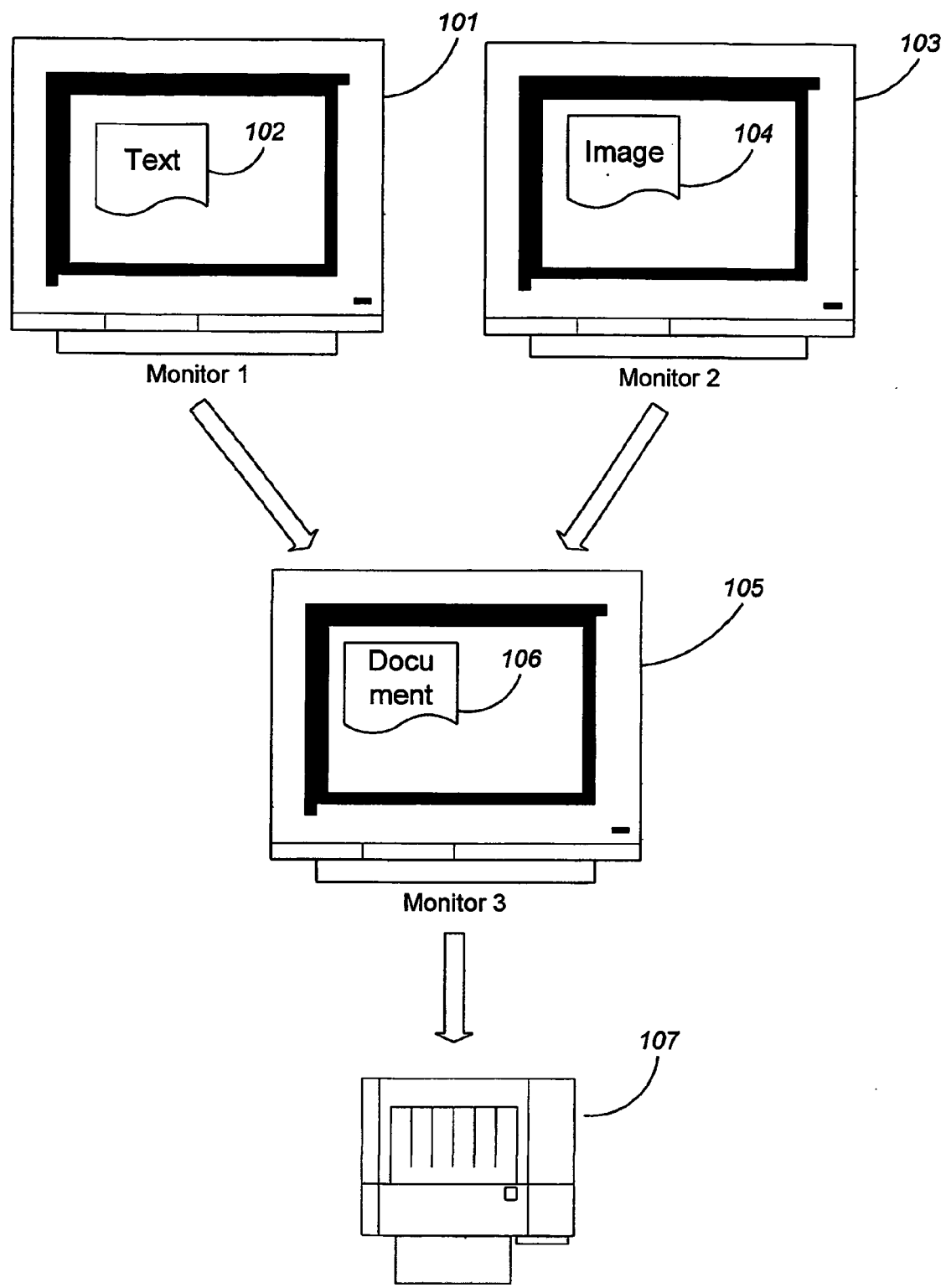
FIG. 1 is a schematic illustration of a workflow used to create a graphic document.

FIG. 1 illustrates a simple workflow in which the invention may be used. The invention can be used in more sophisticated workflows, and the utility of the invention does not depend upon the type or sophistication of the workflow in which it is used. As shown in FIG. 1, a document containing an image object 104 is manipulated in an application running on a computer 103 to adjust the image's colors. Elsewhere, a second document containing a text object 102 is created in a second application running on a second computer 101. The documents containing both text object 102 and image object 104 are sent to a third application running on a third computer 105 where they are combined to form a third document 106. The combined document 106, containing image object 104 and associated text object 102 represents the final step in each object's workflow. Finished document 106 is printed out on a color printer 107.

As image object 104 and text object 102 move through their respective workflows depicted in FIG. 1, from computer to computer and application to application, their associated colors are likely to be manipulated, and even slightly altered, by each application's color management routines. To prevent alteration or coloration of neutral gray colors that may be associated with these or other types of objects, an application can implement a gray color preservation method such as the method schematically illustrated in FIG. 2. Because an application typically performs color management or manipulation on a document or object when the document or object is opened, saved, printed, or exported, or upon the importation of an external document or object, the method shown in FIG. 2 should be executed before a document or object is opened, saved, printed, or exported, or before importation of an external document or object.

Figure 2:
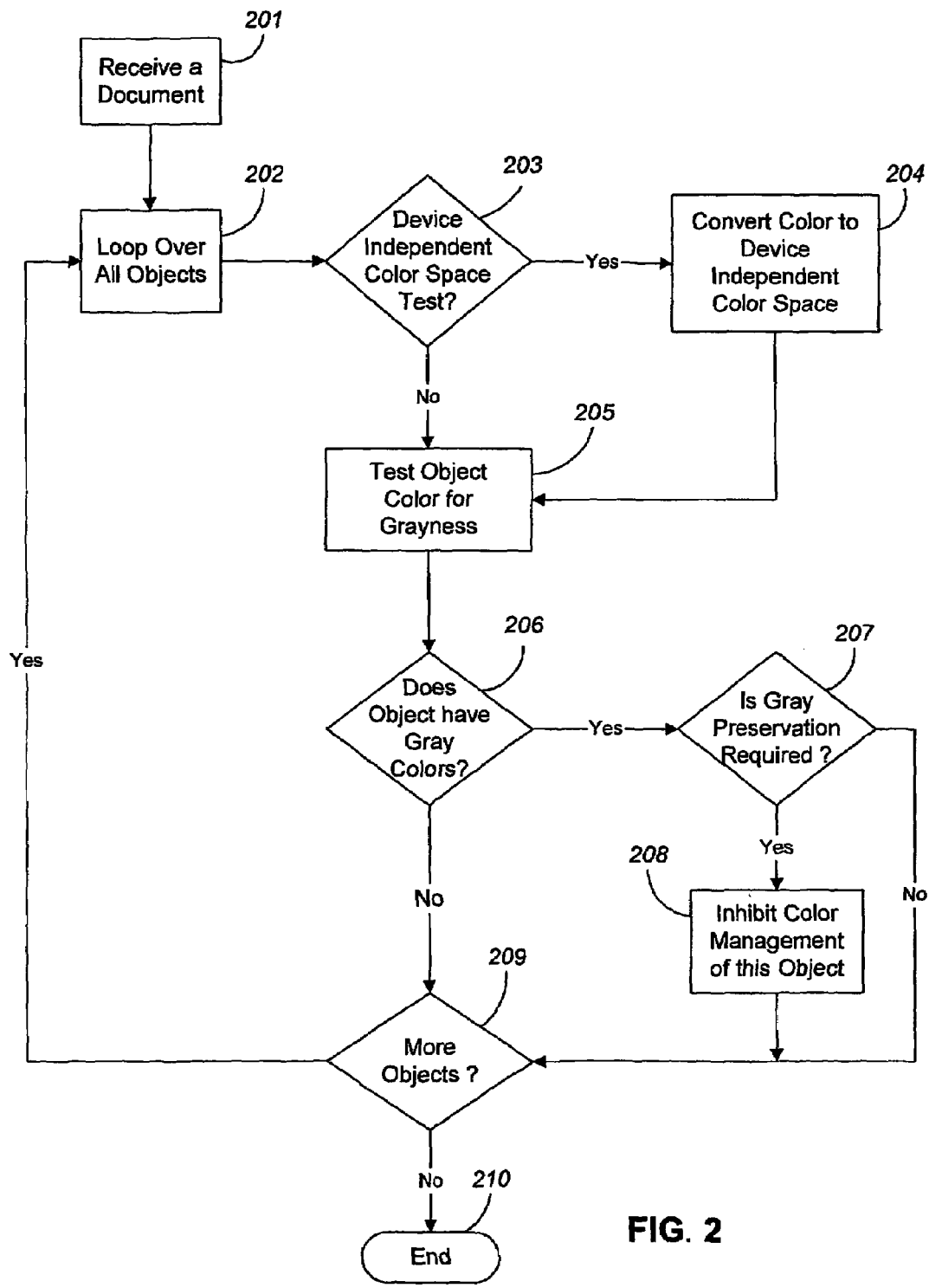
FIG. 2 is a flow chart showing a method for preserving gray colors in certain types of objects in a color document.

As shown in FIG. 2, an application having color management routines receives an electronic document (step 201). In general, the received electronic document contains a variety of objects having a variety of object types such as text, lines, curves, fills, gradients, bitmaps, compressed images, and sounds. In general, not all objects in the received document will require gray preservation. Consequently, each object in the document is selected (step 202) by the gray preservation routine, tested for grayness (steps 205–206), and tested for its gray preservation requirements (step 207). When all objects in the received document have been examined (step 209), the gray preservation routine terminates (step 210).

The received electronic document (step 201) generally contains two broad categories of objects, irreducible objects and composite objects. Irreducible objects cannot be expressed as a combination of other objects. By contrast, composite objects are composed of other objects, and therefore can be expressed as a combination of other objects. For example, a glyph is an irreducible object. A glyph is a bitmap representation of a character in a given font. By contrast, a text object, consisting of a character string having a font attribute, is a composite object. A character string having a font attribute is a string of glyphs, where each glyph represents a different character in the string. Generally, the gray preservation routine of FIG. 2 selects (step 202) and identifies (step 207) irreducible objects requiring gray preservation. When composite objects are encountered, the gray preservation routine processes each component object separately to determine its gray preservation requirements.

The gray preservation routine tests selected objects (step 202) for grayness in either their current color space or in a device independent color space (steps 203–205). In one implementation, selected objects are tested for grayness in a device independent color space. In this implementation, each object has its color or colors converted to a device independent color space (step 204) prior to having its color or colors tested for grayness (step 205). The object's color can be converted to any device independent color space, including any of the CIEbased color spaces such as CIEbasedABC, CIEbasedDEF, CIEbasedDEFG, CIELAB, or CIEXYZ. In one implementation, the object's color is converted to the CIEXYZ color space. In another implementation, selected objects have their colors tested in their current color space. In another implementation, selected objects have their colors tested in either a device independent color space or in a current color space according to user preference. In this implementation, the application provides the user with means to input preferences, including the preference for testing objects for grayness in a local color space or in a device independent color space. User preferences can be selected on an object by object basis, or on a document by document basis. The user preference means can be a graphical user interface, or any other form of data input.

The gray preservation routine tests selected objects for grayness (step 205) using appropriate tests for the color space in which the selected objects' colors are represented. As a general rule, every color space represents various shades of gray according to a well defined color scheme. The scheme used by a particular color space to represent shades of gray within that color space is exploited by the gray preservation routine to test whether a given object whose color is represented in that color space is gray.

For example, RGB color spaces represent gray colored objects with RGB 3-tuples having equal red, green, and blue components. Thus, the RGB triplet (5,5,5) represents one shade of gray, while the RGB triplet (17,17,17) represents another shade of gray. The test for gray colored objects in an RGB color space is therefore a test for R=G=B. Similarly, CMYK color spaces represent gray colored objects with CMYK 4-tuples having cyan, magenta, and yellow components which are identically zero. Thus, the CMYK 4-tuple (0,0,0,5) represents one shade of gray, while the CMYK 4-tuple (0,0,0,17) represents another shade of gray. The test for gray colored objects in a CMYK color space is therefore a test for C=Y=M=0. The tests for grayness in device independent color spaces are similar. For example, in the CIEXYZ color space, gray colored objects are represented by 3-tuples having equal X, Y, and Z tristimulus components when normalized to the tristimulus representation of the diffuse white point, $(X_W, Y_W, Z_W)$. Thus, the test for gray colored objects in the CIEXYZ color space is $X/X_W=Y/Y_W=Z/Z_W$.

A variety of tests for grayness can be performed. In one implementation, the gray test is strict. A strict color test requires an exact match to the color space's scheme for representing gray objects. For example, a strict color test for a gray-object represented in an RGB color space requires the components of the object's RGB 3-tuple to be identical, i.e., it requires R=G=B. In another implementation, the gray test is relaxed. In a relaxed color test, an object's color representation need only approximately match the color space's scheme for representing gray colored objects. For example, one relaxed color test for a gray object represented in an RGB color space requires the components of the object's RGB 3-tuple obey the relationships:

$$R/G = 1 \pm \epsilon; \text{ and} \quad (1)$$

$$R/B = 1 \pm \delta, \quad (2)$$

where $\epsilon$ and $\delta$ are two small numbers. Typically, $\epsilon$ and $\delta$ are on the order of a few percent. However, larger or smaller values can be used. Similarly, other relaxed tests can be used. For example, R/G and R/B in equations (1) and (2) can be replaced with G/R and G/B. Other variations can be used that realize: R~G~B.

Relaxed color tests can be performed in different color spaces as well. For example, one relaxed color test in a CMYK color space requires the components of the object's CMYK 4-tuple obey the relationships:

$$C = 0 \pm \delta; \quad (3)$$

$$M = 0 \pm \epsilon; \text{ and} \quad (4)$$

$$Y = 0 \pm \zeta; \quad (5)$$

where $\delta$, $\epsilon$ and $\zeta$ are small numbers, typically on the order of a few percent. However, larger and smaller values can be used. Similarly, other relaxed tests can be used. For example, C and M in equations (3) and (4) can be replaced with C-M and C-Y, while equation (5) remains the same. Other variations can be used that realize: C~M~Y~0.

In one implementation, the gray color test performed in step 205 is a relaxed color test only if the test is performed in a device independent color space, such as the CIEbased CIEXYZ color space. A relaxed color test for a gray colored object represented in a CIEXYZ color space requires the normalized components of the object's CIEXYZ 3-tuple obey the relationships:

$$(X/X_W)/(Y/Y_W) = 1 \pm \epsilon; \text{ and} \quad (6)$$

$$(X/X_W)/(Z/Z_W) = 1 \pm \delta; \quad (7)$$

where $\epsilon$ and $\delta$ are two small numbers. Typically, $\epsilon$ and $\delta$ are on the order of a few percent. However, larger and smaller values can be used. Similarly, other relaxed tests can be used.

In performing the gray color test (step 205), the gray preservation routine determines if the object contains gray colors (step 206). An object contains gray colors if one or more of the colors associated with the object passes the gray color test. If the selected object does not contain gray colors, the gray preservation routine checks whether all of the objects within the received document have been tested (step 209). If all of the objects have been tested, the gray preservation routine terminates (step 210). Otherwise, it selects anew object to test (step 202). If the selected object contain gray colors (step 206), the gray preservation routine checks whether the object requires gray preservation (step 207). If the object does not require gray preservation (step 207), the gray preservation routine checks whether all of the objects within the received document have been tested (step 209). If all of the objects have been tested, the gray preservation routine terminates (step 210). Otherwise, it selects a new object to test (step 202).

In general, not all objects containing gray colors (step 206) will require gray preservation (step 208). Instead, certain types of objects will almost always require gray preservation, while other types of objects will only occasionally require gray preservation. Objects that almost always require gray preservation tend to be objects possessing a single color attribute, or single color. Examples include texts line, curve, and fill objects. Objects that only occasionally require gray preservation, tend to be objects that possess multiple color attributes, or multiple colors. Examples include gradients, bitmaps, and image objects.

Objects having multiple color attributes which only contain gray colors generally require gray preservation. For example, a gray-scale gradient containing only neutral gray colors requires gray preservation to ensure that its grays are not altered or colorized by color management routines. Conversely, objects having multiple color attributes which contain some gray and some non-gray colors generally do not require gray preservation. For example, a color gradient from red to gray to green will not require gray preservation because many of the colors along the gradient will be shifted by color management routines. If neutral gray colors in the gradient are shifted to non-neutral colors by the color management routines, it is likely that nearby non-neutral colors in the gradient will be shifted to neutral gray colors by the same routines. Thus, by allowing the neutral gray colors to shift, i.e. by turning off gray preservation for the color gradient, the continuity and density of all of the colors in the gradient is better preserved.

If gray color preservation is required for a gray colored object (step 207), the gray preservation routine preserves the object's gray color (step 208) by inhibiting color management in its associated application. In one implementation, the gray preservation routine inhibits color management by flagging the object, or by associating an attribute with the object, indicating that the object is not to be color managed. In another implementation, the gray preservation routine inhibits color management of identified gray colored objects by converting the colors of the objects to a color space that is not color managed by its associated application, or by any of the other applications handling the object along the object's workflow. For example, Adobe's DeviceCMYK color space is not color managed by the Adobe Photoshop®, IIlustrator®, or InDesign® applications. Thus, in a workflow consisting of only these applications, color management of gray colored objects identified as requiring gray preservation can be inhibited by storing the objects' colors in Adobe's DeviceCMYK color space. Other methods of inhibiting color management can also be used.

This invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. Accordingly, other embodiments are within the scope of the following claims.

What is claimed is:

1. A method for preserving the grayness of gray colored objects in an electronic document, comprising:
   identifying gray colored objects in an electronic document; and
   inhibiting color management of the identified gray colored objects while permitting color management of other objects in the electronic document.

2. The method of claim 1, wherein the step of inhibiting color management of identified gray colored objects comprises storing the color of the identified objects in a non-color managed color space.

3. The method of claim 1, wherein the step of inhibiting color management of identified gray colored objects comprises flagging the objects to indicate the objects should not be color managed.

4. The method of claim 1, wherein the step of identifying gray colored objects within a document comprises testing the colors of the objects for grayness using a strict color test.

5. The method of claim 4, wherein an object is identified as a gray colored object when all of its colors pass the strict color test.

6. The method of claim 4, wherein the strict color test is performed in an RGB color space and identifies gray colors as colors having equal red, green, and blue components.

7. The method of claim 4, wherein the strict color test is performed in a CMYK color space and identifies gray colors as colors having identically zero cyan, magenta, and yellow components.

8. The method of claim 4, further comprising converting the colors of objects to a device independent color space, and testing the colors of the objects for grayness in the device independent color space.

9. The method of claim 8, wherein the device independent color space is the CIEXYZ color space, and gray colors are identified as having equal X, Y, and Z tristimulus components in the CIEXYZ color space when normalized to the tristimulus representation of the diffuse white point in that color space.

10. The method of claim 1, wherein the step of identifying gray colored objects within a document comprises testing the colors of the objects for grayness using a relaxed color test.

11. The method of claim 10, wherein an object is identified as a gray colored object when all of its colors pass the relaxed color test.

12. The method of claim 10, wherein the relaxed color test is performed in an RGB color space and identifies gray colors as colors having approximately equal red, green, and blue components.

13. The method of claim 10, wherein the relaxed color test is performed in a CMYK color space and identifies gray colors as colors having approximately zero cyan, magenta, and yellow components.

14. The method of claim 10, further comprising converting the colors of objects to a device independent color space, and testing the colors of the objects for grayness in the device independent color space.

15. The method of claim 14, wherein the device independent color space is the CIEXYZ color space, and gray colors are identified as colors having approximately equal X, Y, and Z tristimulus components in the CIEXYZ color space when normalized to the tristimulus representation of the diffuse white point in that color space.

16. The method of claim 1, wherein the step of identifying gray colored objects within a document further comprises:
   selecting objects having a predetermined object type, and
   identifying gray colored objects by testing the colors of selected objects for grayness.

17. The method of claim 16, wherein the step of selecting objects having a predetermined object type comprises selecting text, line, curve, fill, gradient, bitmap, and image objects.

18. The method of claim 16, wherein the step of selecting objects having a predetermined object type further comprises:
   identifying composite objects and the irreducible objects composing the composite objects; and
   selecting the irreducible component objects for gray color testing.

19. A computer program product, stored on a machine-readable medium, comprising instructions operable to cause a programmable processor to:
   identify gray colored objects within the document; and
   inhibit color management of the identified gray colored objects while permitted color management of other objects in the electronic document.

20. The computer program product of claim 19, wherein the instruction to inhibit color management of the identified gray colored objects comprises instructions to store the color of identified gray colored objects in a color space which is not color managed.

21. The computer program product of claim 19, wherein the instruction to inhibit color management of the identified gray colored objects comprises instructions to flag the objects to indicate the objects should not be color managed.

22. The computer program product of claim 19, wherein the instruction to identify gray colored objects within a document comprises instructions to test the colors of the objects for grayness using a strict color test.

23. The computer program product of claim 19, wherein the instruction to identify gray colored objects within a document comprises instructions to test the colors of the objects for grayness using a relaxed color test.

24. The computer program product of claim of claim 22 or 23, wherein the instruction to identify gray colored objects within a document comprises instructions to identify objects as gray colored if all of the objects colors pass the color test.

25. The computer program product of claim 19, further comprising instructions to convert the colors of objects to a device independent color space, and test the colors of the objects for grayness in die device independent color space.

26. The computer program product of claim 25, wherein the device independent color space is the CIEXYZ color space, and the colors of the objects are tested for grayness in the CIEXYZ color space.

27. The computer program product of claim 19, wherein the instruction to identify gray colored objects within a document comprises instructions to:
select objects having a predetermined object type, and
inhibit color management of the identified gray colored objects while permitting color management of other objects in the electronic document.

28. The computer program product of claim 27, wherein the instruction to select objects having a predetermined object type comprises instructions to select text, line, curve, fill, gradient, bitmap, and image objects.

29. The computer program product of claim 27, wherein the instruction to select objects having a predetermined object type further comprises instructions to:
identify composite objects and the irreducible objects composing the composite objects; and
select the irreducible component objects for gray color testing.

* * * * *